United States Patent Office 3,422,072
Patented Jan. 14, 1969

3,422,072
POLYMERIZATION OF ALDEHYDES IN THE PRESENCE OF ANHYDROUS POLAR SOLVENTS AND ALKALI METAL ALKOXIDE CATALYSTS
Stanley Robert Sandler, Springfield, and Edward Charles Leonard, Jenkintown, Pa., assignors to The Borden Company, New York, N.Y., a corporation of New Jersey
No Drawing. Continuation-in-part of application Ser. No. 513,091, Dec. 10, 1965. This application Jan. 26, 1966, Ser. No. 523,045
U.S. Cl. 260—67      5 Claims
Int. Cl. C08g 1/20; C08g 1/06; C08g 1/08

ABSTRACT OF THE DISCLOSURE

This invention relates to the polymerization of aldehydes into polymers containing hydroxyl groups in the repeating unit. The process comprises reacting an aldehyde at a reduced temperature of up to about 15° C. in the presence of an alkali metal alkoxide as the polymerization catalyst and a polar solvent as the reaction medium.

---

This is a continuation-in-part of application Ser. No. 513,091, filed Dec. 10, 1965, now abandoned.

This invention relates to preparation of polymers which contain hydroxy groups. More particularly, the invention relates to reduced temperature polymerization of aldehydes using alkali metal alkoxides as catalyst of polymerization and polar solvents as the reaction medium.

Polymerization of aldehydes in the presence of metal alkoxides is known, however, infrared spectral analyses has shown that the structure of the product of polymerization is a polyether. These polymers have been found to contain a plurality of ${-}(C(R)-O){-}$ groups as the repeating monomeric structure therein.

We have found that a polyether structure may be substantially avoided in an aldehyde polymerization of this type by causing the polymerization reaction to take place in an anhydrous polar solvent below about 15° C. and that the proportion of either groups increases as the temperature of polymerization is increased. We have further found that alkali metal alkoxides, and especially potassium tertiary butoxide in catalytic proportions yields polymers which contain appendant hydroxy groups and substantially no ether linkages at lower temperatures. Infrared spectral analyses confirms that the hydroxy polymer is preferentially formed when polar solvents are used in the polymerization process and that the ether structured polymer is preferentially formed when the same process is repeated in a nonpolar solvent.

The present invention provides a process for preparing hydroxy group containing polymers from aldehydes other than formaldehyde, and comprising the following general structural formula in the repeated unit:

(1)

and more particularly a polyvinyl alcohol type of polymer from acetaldehyde. R is described below.

Briefly stated, the present invention comprises the process of reacting aldehydes other than formaldehyde in an anhydrous polar solvent in the presence of alkali metal alkoxide catalyst. Below a polymerization temperature of about 15° C., the proportion of hydroxy containing moieties in the polymer relative to ether containing moieties is substantially increased and further increases as the temperature is reduced. The invention also contemplates polymers comprising hydroxy and ether groups. The invention will primarily be described in connection with the polymerization of acetaldehyde to form a polyvinyl alcohol type of polymer.

As to the end groups, or terminal groups of the polymer made by this process, it is believed that they are patterned after the monomeric aldehyde need in the polymerization, however, reactions may take place during polymerization which may cause the terminal groups to vary, i.e., the carboxy group of the aldehyde may be oxidized to a carboxylic group. In any case, the invention is involved with the repeating hydroxy containing moieties in the polymer.

As to the size of the polymeric unit, it can vary as desired. The molecular weight is readily controllable over substantially any range desired, as for example, up to 400,000 and greater, by employing standard practices, as for example, controlling the polymerization time.

As to materials, the aldehyde monomer is of the structural formula

(2)

wherein R (same as above) is a moiety which is selected from the group consisting of $C_1-C_8$ saturated aliphatic hydrocarbons, and halogenated derivatives of said hydrocarbons which are non-reactive with any of the other materials which may be present in the polymerization mixture to be described. Examples of the aldehydes include: acetaldehyde, propionaldehyde, butyraldehyde, octaldehyde, monochloroacetaldehyde, 5-chloropentaldehyde, 9, 9,9-trichlorononaldehyde, hexaldehyde and heptaldehyde. The preferred aldehyde is acetaldehyde and the resultant product of its polymerization is a polyvinyl alcohol type of polymer believed to have the following general structure:

(3)

Where an aldehyde other than acetaldehyde is used, the general formula shown is modified in accordance with the particular R group of the aldehyde used.

The catalyst for polymerization is an alkali metal alkoxide, wherein said metal is selected from the group consisting of sodium, potassium, lithium and cesium. The alkyl group of said alkoxide is a $C_1-C_6$ alkyl group and preferably a tertiary alkyl group. The preferred catalyst is potassium tertiary butoxide.

As to the solvent, we have found that there are several critical factors which must be considered in this process of preparing hydroxy group containing polymers from aldehydes. One is that the solvent must be polar in nature, that is, having a dielectric constant as at least about 4 at room temperature and generally 7 or greater. It is recognized that in selecting an organic solvent, a balance must be achieved between one having a high constant and the ease with which that solvent is removed from the polymerization system since generally solvents with high dielectric constants have high boiling points. Organic solvents substantially below the minimum value are considered to be inoperative for this process in that the proportion of hydroxy group containing polymer produced is negligible. Another limitation is that the solvent and the polymerization system be anhydrous. In addition to the polar nature of the solvent, it must also, of course, dissolve the particular monomer aldehyde but be non-reactive therewith. Examples of the polar solvent include tetrahydrofuran, dimethoxyethane, dimethylsulfoxide, dioxane, dimethylformamide, dimethylacetamide, trinitromethane and nitrobenzene and the like. Tetrahydrofuran (dielectric constant: 7.58 at 20° C.; boiling point: 66° C.

at 760 mm.) has been found to be a good balance between the dielectric constant and the boiling point. It is important to note that non-polar solvents such as hexane, benzene, carbontetrachloride, cyclohexane and the like, will allow polymerization of an aldehyde to take place in that medium, but the polymer formed is not known to include therein in appreciable proportion, any hydroxy group containing polymer; rather the resulting product is predominantly a polyether as described or another structure if the solvent is reactive with the monomer.

The process comprises making a solution of the aldehyde in the polar solvent and cooling that solution. Catalyst is slowly added to the aldehyde solution while maintaining the temperature below about 15° C. Agitation can be used to advantage to insure complete contact of the monomer and catalyst. After polymerization has proceeded to about 25%, the temperature may be increased to about room temperature, as for example, 18°–30° C. Agitation is continued to advantage until polymerization is complete. The time required to complete the polymerization may be an additional two hours. Ether is added to precipitate the polymer. The polymer is separated as by filtering the solution. The polymer is then dissolved in a suitable solvent such as water and neutralized with acid and preferably a mineral acid such as HCl. Salts formed by neutralization may be suitably removed by passing the solution through ion exchangers in the acid and base form. The polymer solution may then be evaporated to dryness and further purified by treatment with solvents as discussed above.

In practice the dried polymer was analyzed on an infrared spectrophotometer and the spectrum determined. Comparison of the spectrum of products made by the process described with polymers made in non-polar solvents clearly shows the difference in end products. The products of this process show curves coinciding with known polyvinyl alcohol whereas products made in non-polar solvents show curves coincidental with polyaldehydes, i.e., containing predominantly the polyether groups. Additional evidence that the resulting polymer is a hydroxy group containing polymer is that reaction with acetic acid results in an acetylated product as determined on infrared spectrum apparatus.

As to proportions, the amount of catalyst needed for the polymerization to proceed at a reasonable rate is in the range of about .01–.5 mole for each mole of aldehyde used. It has been found that less than .01 mole of catalyst reduces the practical yield of polymer formation. When more than .5 mole of catalyst are used, polyvinylalcohol is produced in yields substantially no higher than with .5 mole or catalyst. Within this range the preferred proportion which results in the highest yields is .04–0.1 mole, and .05 mole is the optimum proportion of catalyst.

The solvent proportion is not critical as long as sufficient solvent is used to provide for good reaction conditions. Good results were obtained using approximately 90–125 ml. of solvent with about 13 grams of aldehyde.

As to the temperature, the reaction is best carried out below 15° C. Temperatures higher than 15° C. cause an increase in the proportion of the ether structure in the polymer. Polymers prepared at higher temperatures comprise hydroxy groups and ether groups moieties, the ratio of ether groups to hydroxy groups being increased with increasing reaction temperature.

In the examples that follow and elsewhere herein, proportions are expressed as parts by weight unless specifically stated to the contrary.

Example I

To a dry, ice-cooled reaction was added 0.3 mole acetaldehyde (13.2 g.) and 30 ml. of dry tetrahydrofuran (THF). The reaction was flushed with nitrogen while cooling to 0° C. Potassium tertiary butoxide (0.054 mole) was dissolved in 60 ml. dry THF and slowly added to the acetaldehyde over a 1–2 hour period keeping the temperature at 0° C. After the addition the mixture was stirred for an additional 2 hours. Ethyl ether (100 ml.) was added and the solids (21 g.) were filtered. The solids were dissolved in water, neutralized with HCl, mixed with 20 g. mixed bed ion exchange resins, filtered, decolorized and concentrated to yield 4.5 g. of a tan solid. The infrared spectrum was very similar to that of polyvinylalcohol. The polymer was soluble in water and softened at 140–145° C. The polymer darkened at 210–233° C. to a brown-black solid. Polyvinyl alcohol softens at 138–145° C. and darkens to a reddish brown solid at 220–240° C. The molecular weight of the polyvinyl alcohol type polymer so made was about 10,000 as determined by the intrinsic viscosity of the derived acetylated product by acetylating the polymer made with acetic anhydride.

To further verify its structure the polymer was acetylated with acetic anhydride in pyridine. After the unused reactants were removed the acetylated product was extracted into acetone and concentrated to dryness. The resulting brown solid, softening point, about 85° C., had an infrared spectrum substantially identical to polyvinylacetate.

Example II

The procedure of Example I was repeated except that the tetrahydrofuran was replaced by like quantity of n-hexane. Infrared spectral analyses of this product showed it to be substantially identical with polyacetaldehyde. Similar results were obtained with other non-polar solvents. This example is not part of this invention, but is included by way of comparison.

Example III

The procedure of Example I is repeated except that the solvent, tetrahydrofuran, is replaced separately and in turn by the other polar solvents disclosed herein. Hydroxy group containing polymers having infrared spectral characteristics of polyvinyl alcohol result. Acetylation as described results in a polyvinylacetate type of structure.

Example IV

The procedure of Example I is repeated except that the acetaldehyde is replaced separately and in turn by the aldehydes herein described. Hydroxy group containing polymers having infrared spectral characteristics of polyvinyl alcohol result. Acetylation as described results in a polyvinylacetate type of structure.

Example V

The procedure of Example I is repeated except that the potassium tertiary butoxide catalyst is replaced separately and in turn by the alkali metal alkoxides herein described and in the range of proportions disclosed. Hydroxy group containing polymers having infrared spectral characteristics of polyvinyl alcohol result. Acetylation as described results in a polyvinylacetate type of structure.

Example VI

The procedure of Example I is repeated except that the polymerization temperature is maintained at about above 18° C. Infrared spectral analyses of the resulting polymer discloses a significant proportion of ether groups without significant proportion of hydroxy groups therein.

Example VII

The procedure of Example I is repeated except that the temperature of reaction is maintained at −70° C. The time of reaction is lengthened by the reduced temperature. Hydroxy group containing polymers having infrared spectral characteristics of polyvinyl alcohol result. Acetylation as described results in a polyvinyl acetate.

It will be understood that it is intended to cover all changes and modifications of the examples of the invention herein chosen for the purpose of illustration which do not constitute departures from the spirit and scope of the invention.

We claim:
1. The polymerization process for making polymeric material containing hydroxy groups comprising the step of:
  (1) admixing:
    (a) an aldehyde selected from the group consisting of acetaldehyde, propionaldehyde, butyraldehyde, octaldehyde, monochloroacetaldehyde, 5 - chloropentaldehyde, 9,9,9 - trichlorononaldehyde, hexaldehyde and heptaldehyde;
    (b) an anhydrous organic polar solvent for said aldehyde being selected from the group consisting of tetrahydrofuran, dimethoxyethane, dimethylsulfoxide, dioxane, dimethylformamide, dimethylacetamide, trinitromethane and nitrobenzene; and
    (c) an alkali metal alkoxide catalyst of polymerization for said aldehyde wherein the alkyl group of said catalyst is selected from the group consisting of $C_1$–$C_6$.

2. The process of claim 1, wherein the temperature of said admixture is maintained below about 15° C.

3. The process of claim 2, wherein the proportion of said catalyst is in the range of between about .01–.5 mole for each mole of said aldehyde.

4. The process of claim 2, including the step of increasing said temperature to about room temperature after partial polymerization.

5. The polymerization process for making a polyvinyl alcohol type of polymer comprising the general structural formula:

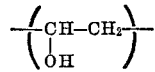

comprising the steps of:
  (1) admixing:
    (a) acetaldehyde;
    (b) tetrahydrofuran; and
    (c) potassium tertiary butoxide; and
  (2) maintaining the temperature of said admixture below 15° C.;

the proportion of said catalyst being in the range of between about .01–.5 mole for each mole of acetaldehyde.

References Cited

UNITED STATES PATENTS 2,274,749   3/1942   Smyers _____ 260—67

WILLIAM H. SHORT, *Primary Examiner.*

L. M. PHYNES, *Assistant Examiner.*

U.S. Cl. X.R.

260—73, 78.3